United States Patent
Jörn et al.

(10) Patent No.: US 10,301,003 B2
(45) Date of Patent: May 28, 2019

(54) METHOD FOR CONNECTING FIBER-REINFORCED STRUCTURAL COMPONENTS

(71) Applicant: Airbus Operations GmbH, Hamburg (DE)

(72) Inventors: Paul J Jörn, Hamburg (DE); Markus Müller, Friedrichshafen (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 267 days.

(21) Appl. No.: 15/141,203

(22) Filed: Apr. 28, 2016

(65) Prior Publication Data
US 2016/0318631 A1    Nov. 3, 2016

(30) Foreign Application Priority Data

Apr. 28, 2015    (DE) .................. 10 2015 106 563

(51) Int. Cl.
*B29C 65/00*    (2006.01)
*B29C 65/56*    (2006.01)
(Continued)

(52) U.S. Cl.
CPC ............ *B64C 1/064* (2013.01); *B29C 65/562* (2013.01); *B29C 65/604* (2013.01);
(Continued)

(58) Field of Classification Search
CPC ..... B29C 65/562; B29C 65/60; B29C 65/604; B29C 66/0242; B29C 66/024;
(Continued)

(56) References Cited

U.S. PATENT DOCUMENTS 4,219,980 A * 9/1980 Loyd .................. B29C 65/561
    156/92
4,761,871 A * 8/1988 O'Connor ............ B29C 65/562
    29/432.1
(Continued)

FOREIGN PATENT DOCUMENTS

DE     102004038084 A1    3/2006
DE  10 2007 062 087 A1    7/2009
(Continued)

OTHER PUBLICATIONS

German Patent Office, German Search Report for German Patent Application No. 10 2015 106 563.0 dated Jan. 27, 2016.

*Primary Examiner* — Jermie E Cozart
(74) *Attorney, Agent, or Firm* — Lorenz & Kopf LLP (57) ABSTRACT

This pertains to a method for connecting fiber-reinforced structural components. In a first step of the method, a first fiber-reinforced structural component and a second fiber-reinforced structural component are supplied. In another step, the first fiber-reinforced structural component and the second fiber-reinforced structural component are heated by means of a heating device. A penetration through the first fiber-reinforced structural component and the second fiber-reinforced structural component is produced in another step by means of a fastening device. In another step, the first fiber-reinforced structural component is connected to the second fiber-reinforced structural component by means of the fastening device. This furthermore pertains to a structural aircraft element.

18 Claims, 4 Drawing Sheets

(51) Int. Cl.
| | |
|---|---|
| *B29C 65/60* | (2006.01) |
| *B64C 1/06* | (2006.01) |
| *B64F 5/10* | (2017.01) |
| B64C 1/00 | (2006.01) |
| B29K 301/00 | (2006.01) |
| B29K 305/00 | (2006.01) |
| B29K 307/04 | (2006.01) |
| B29K 309/02 | (2006.01) |

(52) U.S. Cl.
CPC .... *B29C 66/0242* (2013.01); *B29C 66/02242* (2013.01); *B29C 66/1122* (2013.01); *B29C 66/21* (2013.01); *B29C 66/41* (2013.01); *B29C 66/72141* (2013.01); *B29C 66/73921* (2013.01); *B64C 1/061* (2013.01); *B64C 1/066* (2013.01); *B64F 5/10* (2017.01); *B29C 65/60* (2013.01); *B29C 66/7212* (2013.01); *B64C 2001/0072* (2013.01); *Y02T 50/43* (2013.01); *Y02T 50/46* (2013.01); *Y10T 29/49801* (2015.01); *Y10T 29/49865* (2015.01); *Y10T 29/49963* (2015.01); *Y10T 29/49964* (2015.01)

(58) Field of Classification Search
CPC .......... B29C 66/72141; B29C 66/7212; B29C 66/73921; B29C 66/1122; Y10T 29/49865; Y10T 29/49801; Y10T 29/49964; Y10T 29/49963
See application file for complete search history.

(56) References Cited

U.S. PATENT DOCUMENTS

| | | | |
|---|---|---|---|
| 9,023,455 B2* | 5/2015 | McKelvey Campbell | ................... B23P 11/00 428/133 |
| 2012/0181250 A1* | 7/2012 | Jalbert | ................ B29C 65/1612 216/34 |
| 2014/0212616 A1* | 7/2014 | McKelvey Campbell | ................... B23P 11/00 428/43 |
| 2015/0290914 A1* | 10/2015 | Campbell | ........... B32B 38/0036 411/502 |

FOREIGN PATENT DOCUMENTS

| | | |
|---|---|---|
| DE | 102014203761 A1 | 9/2015 |
| FR | 2 933 378 A1 | 1/2010 |
| GB | 2278571 A | 12/1994 |

* cited by examiner

METHOD FOR CONNECTING FIBER-REINFORCED STRUCTURAL COMPONENTS

CROSS-REFERENCE TO RELATED APPLICATION

This application claims priority to German Patent Application No. 10 2015 106 563.0, filed Apr. 28, 2015, which is incorporated herein by reference in its entirety.

TECHNICAL FIELD

The embodiments described herein pertain to the assembly of structural components, and particularly to a method for connecting fiber-reinforced structural components and to a structural aircraft element.

BACKGROUND

In addition, other objects, desirable features, and characteristics will become apparent from the subsequent summary and detailed description, and the appended claims, taken in conjunction with the accompanying drawings and this background.

Structural components, particularly fiber-reinforced structural components, are nowadays gaining more and more importance in terms of weight savings, which are particularly relevant in the construction of vehicles and aircraft. For example, screw joints, rivet joints, soldered joints, welded joints or plug-type connections may be considered for the assembly of some structural components. Particularly in screw joints or rivet joints, it may be necessary to provide bores that respectively serve for accommodating the screws or rivets in the structural components. Such bores are frequently produced with corresponding tools, for example drilling tools, such that the structural components can subsequently be connected to one another, e.g., by means of screws.

DE 10 2007 062 087 B4 describes a method for producing an overlapping hybrid joint between two or more components. In this case, the components to be connected respectively feature a bore that is designed for completely accommodating a rivet head.

FR 2 933 378 A1 describes a method for fixing an antenna on a skin of an aircraft. In this case, holes are drilled through the skin in order to provide fixing bores for receiving stud bolts. The skin is made of a composite material and the stud bolts are made of a metallic material.

SUMMARY

It is an objective of the embodiment described herein to improve the assembly of fiber-reinforced structural components.

According to an aspect of an embodiment, a method for connecting fiber-reinforced structural components is disclosed. In a step of the method, a first fiber-reinforced structural component and a second fiber-reinforced structural component are supplied. In another step of the method, the first fiber-reinforced structural component and the second fiber-reinforced structural component are heated by means of a heating device. In another step, a penetration through the first fiber-reinforced structural component and through the second fiber-reinforced structural component is produced by means of a fastening device. In this case, the penetration may be realized in the form of a bore through the respective structural components. In another step of the method, the first fiber-reinforced structural component is connected to the second fiber-reinforced structural component by means of the fastening device. Another, for example preceding step of the method may comprise pre-drilling the first fiber-reinforced structural component and the second fiber-reinforced structural component. These preliminary bores may consist of holes produced on one side in at least one of the fiber-reinforced structural components.

Such a method makes it possible to positively influence the change of material properties of the fiber-reinforced structural components in the region of the penetration. The matrix, in which the fibers of the fiber-reinforced structural components are laid or embedded, particularly can be softened by heating the fiber-reinforced structural components such that the fibers can be respectively shifted or adapted to the shape of the penetration being produced while the fastening device penetrates the fiber-reinforced structural components. The fibers extending, for example, parallel in the fiber-reinforced structural component therefore undergo a change of direction in the region of the penetration such that the fibers at least partially extend around the penetration in the region of the penetration. In other words, the fibers in the region of the penetration are pushed apart by means of the fastening device when the penetration is produced. In this way it can be achieved that, in contrast to a drilling process without heating of the fiber-reinforced structural components, for example, the fibers are not damaged or separated at all or to a lesser extent only.

For example, the first fiber-reinforced structural component and/or the second fiber-reinforced structural component feature a thermoplastic matrix, in which the fibers are embedded. The fibers consist, for example, of plastic fibers, fibers of a metallic material or fibers of a ceramic material. However, the fibers of the fiber-reinforced structural components preferably comprise carbon fibers. The first and/or the second fiber-reinforced structural component therefore may be respectively made of a carbon fiber-reinforced plastic.

The heating of the first and the second fiber-reinforced structural component is realized, for example, with an external heating device that is arranged in the vicinity of the two fiber-reinforced structural components during the manufacturing process. In this context, it would be conceivable that the heating device only heats one fiber-reinforced structural component by means of thermal radiation, wherein the heated fiber-reinforced structural component heats the second fiber-reinforced structural component by means of thermal conduction. However, it would also be conceivable that two separate heating devices heat the first fiber-reinforced structural component and the second fiber-reinforced structural component by means of thermal radiation or thermal conduction. It is preferred to only heat a region around the penetration to be produced through both fiber-reinforced structural components. This region may have a size, for example, between a few millimeters and several centimeters. For example, the size of the region to be heated depends on the diameter of the penetration and the size of the fastening device. In particular, the fastening device is ultimately used for connecting the two structural components. After penetrating through the first fiber-reinforced structural component and the second fiber-reinforced structural component, the fastening device remains in the penetration.

The penetration may be produced, for example, with a mere translatory motion or with a drilling motion, i.e. a combined rotatory and translatory motion. In the case of a mere translatory motion, the fastening device carries out, for example, a displacement or puncturing process, during which only the material in the region of the penetration through the first fiber-reinforced structural component and the second fiber-reinforced structural component is respectively displaced or pushed out. Such a displacement of the material is particularly promoted in that the material of the fiber-reinforced structural components is heated in the region of the penetration.

The fastening device itself may be realized, for example, in the form of a screw, a rivet, a bolt or a pin. The fastening device may have a pointed shape in order to promote a displacement during the penetration of both fiber-reinforced structural components.

After the penetration of both fiber-reinforced structural components by the fastening device, the two fiber-reinforced structural components are connected to one another with the fastening device. This connection may be produced integrally or in a frictional or positive fashion. This means that parts of the fastening device may fuse with parts of the first fiber-reinforced structural component and/or the second fiber-reinforced structural component or that a mere mechanical or frictional connection between both structural components may be produced, for example in the form of a screw-nut connection. The decision on whether an integral or a frictional connection between the two structural components should be produced can be made in another step by adjusting a predefined temperature for heating the first fiber-reinforced structural component and the second fiber-reinforced structural component. If an integral connection is produced between the two structural components or between the structural components and the fastening device, it would particularly be possible to adjust the temperature for heating the structural components in the region of the penetration higher than in instances, in which a mere frictional connection between the two structural components or between the fastening device and the two structural components should be produced.

In another step, the fiber-reinforced structural components can be installed in a vehicle, particularly an aircraft. The fiber-reinforced structural components therefore may form primary structural components of an aircraft such as, for example, frames, stringers or a skin of the aircraft. However, the fiber-reinforced structural components may also form secondary structural components such as, for example, cabin trim parts, mounts or other frame structures within the aircraft. The first and/or the second structural component may therefore consist, for example, of secondary structural components of a vehicle, as well as of primary structural components of such a vehicle. The structural components particularly are primary or secondary structural components of an aircraft. Examples of secondary structural components are mounts, system connections, system carriers, auxiliary frames, cross members or trim parts of a cabin of the aircraft. Examples of primary structural components are frame structures, reinforcing elements, particularly frames or stringers, as well as skin structures such as the skin of the aircraft.

According to an embodiment, the first fiber-reinforced structural component and the second fiber-reinforced structural component are heated by means of the heating device before and/or while the penetration through the first fiber-reinforced structural component and the second fiber-reinforced structural component is produced.

In this way, it can be ensured that the region of the penetration to be produced already has a certain temperature or is already heated to a predefined temperature while the penetration is produced. This heating process makes it possible to positively influence the material properties while the penetration is produced by means of the fastening device. The thermoplastic matrix of the fiber-reinforced structural components particularly can be softened with such a heating process such that the fibers embedded in the thermoplastic matrix become more flexible and easier to shift or deform in accordance with the fastening device penetrating into the two structural components. The heating process therefore makes it possible to provide more ductile material properties in order to at least partially prevent the fibers from being damaged or separated in the region of the penetration. In another step, the region of the penetration through the first fiber-reinforced structural component and the second fiber-reinforced structural component may be actively cooled. The material in the region of the penetration, which was softened during the heating process, can thereby be hardened again in order to fix the fibers in a position, in which they preferably extend around the penetration after the production thereof.

According to another embodiment, the fastening device is in another step heated with the heating device before and/or while the penetration through the first fiber-reinforced structural component and the second fiber-reinforced structural component is produced.

In this case, the fastening device can be purposefully heated with a separate heating device or with the same heating device used for heating the two structural components. The fastening device is heated, for example, by means of thermal conduction and/or thermal radiation. The fastening device is preferably heated with an external heating device by means of thermal radiation.

It is therefore possible to provide a heating device that heats the fastening device, as well as the two fiber-reinforced structural components, by means of thermal radiation. The heating of the fastening device furthermore promotes a potential fusion of the material of the fastening device with the material of the first and/or the second fiber-reinforced structural component such that an integral connection can ultimately be produced between the two fiber-reinforced structural components or between the two fiber-reinforced structural components and the fastening device, respectively.

According to another embodiment, the first fiber-reinforced structural component and the second fiber-reinforced structural component are heated by utilizing a laser beam.

A laser beam allows the purposeful input of thermal energy into the first fiber-reinforced structural component and/or into the second fiber-reinforced structural component and/or into the fastening device. In this way, a predefined region can be purposefully heated in the respective fiber-reinforced structural component.

However, it is also possible to use other methods for heating the two fiber-reinforced structural components and/or the fastening device. In this context, it would also be conceivable to use heating elements that are arranged on the surface of the two fiber-reinforced structural components before they are penetrated by the fastening device and to thereby heat the structural components by means of thermal conduction in the region of the penetration to be produced. A heating element may furthermore be provided within or on the fastening device such that the fastening device can be separately heated. It would also be possible to provide a heating device or a heating element on a tool that moves the fastening device, i.e. a tool that presses or rotationally drives the fastening device through the two fiber-reinforced structural components in order to produce the penetration, such that the fastening device can be heated by means of thermal conduction.

According to another embodiment, the fastening device features a connecting component and a drilling component that can be separated from the connecting component. In this case, the connecting component and the drilling component are arranged behind one another along a longitudinal axis of the fastening device.

When the penetration through the first fiber-reinforced structural component and the second fiber-reinforced structural component is produced, the longitudinal axis of the fastening device may be aligned parallel to a longitudinal axis of the penetration to be produced. The connecting component may be connected to the drilling component, for example, by means of a mechanical connection or by means of an integral connection. Mechanical connections may consist, in particular, of plug-type connections, screw joints or compression joints. In case an integral connection is produced between the connecting component and the drilling component, a predetermined breaking point may be arranged between both components such that the drilling component can be separated from the connecting component after the penetration has been produced. Such a separable drilling component has the advantage that the connecting component, which ultimately remains in the penetration and thereby connects the two fiber-reinforced structural components, may feature a different material than the drilling component, which is separated after the penetration through the two fiber-reinforced structural components has been produced. For example, the drilling component may feature a suitable material for producing the penetration, wherein the connecting component features a suitable material for producing the integral or frictional connection between the two fiber-reinforced structural components.

The drilling component may have a certain eccentricity referred to the longitudinal axis. A longitudinal axis of the connecting component particularly may be offset relative to a longitudinal axis of the drilling component by a certain distance.

According to another embodiment, the fastening device is designed for additionally generating frictional heat when the penetration is produced in order to heat the first fiber-reinforced structural component and the second fiber-reinforced structural component.

In this context, the connecting component or the drilling component may have a suitable surface for achieving an increased input of thermal energy due to frictional heat generated by the friction between the surface of the connecting component or the drilling component and the matrix of the fiber-reinforced structural components. In this way, additional thermal energy can be released in the region of the penetration. For example, the connecting component may respectively have a rough or roughened surface for this purpose.

According to another embodiment, the connecting component and the drilling component are made of different materials.

For example, the drilling component is made of a metallic material and the connecting component is made of a plastic or a fiber-reinforced plastic. A wear-resistant material particularly may be used for the drilling component in order to effectively drill through both structural components. For example, the drilling component may be made of a wear-resistant metallic alloy or of special steel. After drilling through both structural components, the drilling component is no longer needed and can be separated from the connecting component such that the connecting component ultimately remains in the through-bore extending through the first structural component and the second structural component in order to thereby frictionally connect the first structural component to the second structural component.

According to another embodiment, an external thread is produced on the connecting component in another step of the method, wherein this external thread is designed for frictionally connecting the first fiber-reinforced structural component to the second fiber-reinforced structural component due to its cooperation with a securing element. For example, the securing element consists of a threaded nut.

After the penetration has been produced, the fastening device particularly may be positioned or arranged in the penetration such that the external thread of the fastening device or the connecting component protrudes from the second fiber-reinforced structural component and therefore from the penetration in order to thereby respectively attach the securing element or to screw on the threaded nut. In this way, a frictional connection between both fiber-reinforced structural components in the form of a screw-nut connection can be produced. However, the two structural components may also be connected to one another by pressing, clamping or crimping the connecting component into the through-bore. For example, the connecting component may also be realized in the form of a bolt with a ribbing and without a thread, wherein this bolt-shaped connecting component is positioned in the through-bore and held by a crimped-on securing ring in order to thereby produce a frictional or positive connection between the two structural components. Consequently, it is not absolutely imperative to screw a nut on the second end of the connecting component in order to produce a frictional or positive connection between both structural components.

According to another embodiment, the first fiber-reinforced structural component and/or the second fiber-reinforced structural component are made of a carbon fiber-reinforced plastic.

Such a carbon fiber-reinforced plastic has particularly sound mechanical properties and simultaneously a low weight, wherein the latter is particularly advantageous, for example, with respect to the subsequent use of the two fiber-reinforced structural components in vehicles or aircraft. The first fiber-reinforced structural component, which is connected to the second fiber-reinforced structural component, therefore can be installed in an aircraft in another step of the method. The carbon fibers of the carbon fiber-reinforced plastic are embedded, for example, in a thermoplastic matrix. The fibers essentially extend parallel to one another within the thermoplastic matrix, wherein the carbon fibers may extend other than parallel in the region of the produced penetration. The arrangement of the carbon fibers within the thermoplastic matrix is described in greater detail further below with reference to the description of the figures.

According to an embodiment, the fastening device is at least partially made of a carbon fiber-reinforced plastic.

In this context, it would likewise be possible to provide a thermoplastic matrix that is heated by heating the first fiber-reinforced structural component and the second fiber-reinforced structural component and/or the fastening device itself such that an integral connection can be produced between the fastening device and the two fiber-reinforced structural components, particularly between the thermoplastic matrix of the fastening device and the thermoplastic matrix of the two fiber-reinforced structural components, after the penetration has been produced.

According to another embodiment, a first support disk is in another step provided on a surface of the first fiber-reinforced structural component in the region of the penetration, wherein this first support disk is designed for preventing a geometric deformation of the surface of the first fiber-reinforced structural component while the penetration through the first fiber-reinforced structural component is produced.

The heating of both fiber-reinforced structural components and the production of the penetration by means of the fastening device may lead to a deformation on the surface of the fiber-reinforced structural components, wherein such a deformation can be at least partially prevented by providing the support disk. During the penetration of the two fiber-reinforced structural components, in particular, material is respectively shifted or deformed in such a way that material accumulations can occur on the surface in the region of the penetration. For example, the support disk may have the shape of a circular disk with a central bore or opening, through which the fastening device can be inserted. The support disk may be arranged on the surface of the first fiber-reinforced structural component, for example, before the penetration is produced. However, it would also be possible that the support disk features no bore or opening and the fastening device initially has to drill through the support disk before the penetration through the first fiber-reinforced structural component and the second fiber-reinforced structural component is produced. However, it is preferred that the circular support disk features a centrally arranged opening or bore. The support disk may furthermore be segmented such that it is possible to remove the support disk after the bore has been produced. For example, the surface formed on the structural component by the support disk is thereby used as a supporting surface for the head component.

According to another embodiment, a second support disk is provided on a surface of the second fiber-reinforced structural component in the region of the penetration, wherein this second support disk is designed for preventing a geometric deformation on the surface of the second fiber-reinforced structural component while the penetration through the second fiber-reinforced structural component is produced.

A respective support disk therefore may be simultaneously provided on the surface of the first fiber-reinforced structural component, as well as on the surface of the second fiber-reinforced structural component, and prevent a deformation of the respective surface due to the production of the penetration. It would be conceivable that at least one of the two support disks remains on the surface of the respective fiber-reinforced structural component after the first fiber-reinforced structural component has been connected to the second fiber-reinforced structural component by means of the fastening device. For example, the connecting component of the fastening device may feature a head component in the form of a screw head that fixes the first support disk on the surface of the first fiber-reinforced structural component in the region of the penetration, namely also after the two structural components have been connected to one another. It would likewise be conceivable that the second support disk is also fixed on the surface of the second fiber-reinforced structural component after the penetration has been produced by screwing a threaded nut on the external thread of the connecting component.

The second circular support disk preferably features a centrally arranged opening or bore. The second support disk may furthermore be segmented such that it is possible to remove the support disk after the bore has been produced. For example, the surface formed on the structural component by the second support disk is thereby used as a supporting surface for the head component or the securing element, for example, in the form of a threaded nut.

In addition, the support disks make it possible to observe a certain surface quality of the two structural components. However, it would also be conceivable to arrange no support disks on the respective surfaces in order to thereby produce an intentional deformation or protuberance on the surface of the material. Depending on the respective application, a material accumulation on the surface may particularly be associated with advantageous mechanical properties. The material flexibility achieved due to the utilization of a thermoplastic matrix also makes it possible to arrange the fastening device in the penetration with an angular offset. In other words, the longitudinal axis of the fastening device and the longitudinal axis of the penetration may include an angle.

The support disks may furthermore feature heating elements that are designed for heating certain regions of the first and the second fiber-reinforced structural component.

According to another embodiment, the penetration through the first fiber-reinforced structural component and through the second fiber-reinforced structural component is produced by means of the fastening device due to a mere translatory motion of the fastening device.

In this case, a tool can be moved along the longitudinal axis of the fastening device or of the penetration to be produced in such a way that the fastening device is respectively pressed or pushed through both fiber-reinforced structural components. During this process, the material is shifted due to a displacement process such that the penetration with the fastening device arranged therein is ultimately produced. For example, the fastening device may have a tapered shape in the direction of the translatory motion. This means that the fastening device may be pointed in the direction of the translatory motion such that the puncturing process or the production of the penetration through the two fiber-reinforced structural components is promoted.

According to another embodiment, the penetration through the first fiber-reinforced structural component and through the second fiber-reinforced structural component is produced by means of the fastening device due to a combination of a translatory motion and a rotatory motion of the fastening device.

For example, the fastening device can be driven into the two fiber-reinforced structural components similar to a drilling tool with a rotatory motion or drilling motion. In other words, the fastening device is drilled into the two fiber-reinforced structural components. For example, the production of the penetration may therefore also be based on a cutting process. In any case, the material of the two fiber-reinforced structural components is heated and therefore softened in the region of the penetration to be produced such that the material properties in the region of the penetration can be positively influenced for the manufacturing process.

It would likewise be conceivable that the penetration through the first fiber-reinforced structural component and through the second fiber-reinforced structural component is produced by means of the fastening device due to a vibratory motion or a shaking motion. For example, the fastening device is set in vibration and inserted into the two fiber-reinforced structural components due to a motion in the direction of the longitudinal axis of the fastening device. Furthermore, the fastening device may carry out a rotatory motion while the penetration is produced, namely in such a way that the rotation alternately takes place in two different directions about the longitudinal axis of the fastening device. For example, the fastening device carries out a rotatory motion over 180° in a first direction and subsequently a rotatory motion over 180° in a second direction such that the rotatory motion is realized in the form of a reciprocating or shaking motion. In this respect, the production of the penetration can be distinguished from a mere drilling process through the two fiber-reinforced structural components.

The embodiments described herein generally makes it possible to reduce the number of processing steps required for connecting structural components because the drilling process and the fastening process no longer have to be carried out in two separate steps, but the fastening device featuring the drilling component and the connecting component rather can drill through and immediately thereafter connect the two structural components to one another in one step. This shortens the installation time of such structural components and reduces the so-called non-recurring costs for tools and components, as well as the so-called recurring costs of the manufacturing process. The drilling component may particularly be realized in a reusable fashion. In addition, the processing quality can be improved and the effort for the quality control of the drilling process can be reduced.

This likewise makes it possible to produce a load-optimized connection between the structural components. An advantageous load distribution or load application particularly can be achieved in the region of the penetration, in which the matrix material of the fiber-reinforced structural components may be fused with the material of the fastening device. In this way, the overall number of fastening devices to be provided can be reduced.

The fastening device ultimately combines two processing steps into one processing step, namely drilling through the two structural components on the one hand and frictionally connecting the two structural components on the other hand.

According to an aspect, a structural aircraft element with a first fiber-reinforced structural component and a second fiber-reinforced structural component is disclosed. The structural aircraft element furthermore features a fastening device that is designed for penetrating and subsequently connecting the first fiber-reinforced structural component and the second fiber-reinforced structural component to one another. The fastening device is inserted into the first fiber-reinforced structural component and the second fiber-reinforced structural component while the first fiber-reinforced structural component and the second fiber-reinforced structural component are heated in order to penetrate the first fiber-reinforced structural component and the second fiber-reinforced structural component and to displace fibers of the two fiber-reinforced structural components during the penetration. The fastening device is furthermore inserted into the first fiber-reinforced structural component and the second fiber-reinforced structural component while the first fiber-reinforced structural component and the second fiber-reinforced structural component are heated in order to thereby produce an integral connection between the fastening device and the first fiber-reinforced structural component and/or the second fiber-reinforced structural component.

An integral connection may also be produced, for example, between the fastening device and at least one of the two fiber-reinforced structural components. The integral connection may be produced, for example, by respectively softening and fusing part of the material of the fastening device with part of the material of the first fiber-reinforced structural component and/or the second fiber-reinforced structural component. For example, the structural aircraft element may be respectively arranged or installed in an aircraft, particularly in an airplane. The structural aircraft element represents, for example, the connection between a trim part of the aircraft cabin and a mount for the trim part of the aircraft cabin within the aircraft.

According to another aspect, a fastening system is disclosed. The fastening system features a tool that is designed for penetrating a first fiber-reinforced structural component and a second fiber-reinforced structural component with a fastening device in order to thereby connect the first fiber-reinforced structural component to the second fiber-reinforced structural component by means of the fastening device. The fastening system furthermore features a heating device that is designed for heating the first fiber-reinforced structural component and the second fiber-reinforced structural component in the region of the penetration.

The heating device may furthermore be designed for purposefully heating the fastening device in addition to the two fiber-reinforced structural components. For example, the tool may be arranged on the fastening system such that it can be correspondingly displaced and positioned, wherein the position and alignment of the heating device can likewise be adjusted in such a way that the fiber-reinforced structural components and/or the fastening device are heated in dependence on the position of the fiber-reinforced structural component and/or the fastening device. The fastening system may furthermore feature mounts that fix the first fiber-reinforced structural component and the second fiber-reinforced structural component in a certain position and alignment. In this way, exact positioning of the penetration through both fiber-reinforced structural components can be achieved. This penetration ultimately serves for accommodating the fastening device such that the fastening device frictionally and/or integrally connects the two fiber-reinforced structural components to one another. For example, the heating device may feature a laser that is designed for emitting laser beams in the direction of a region of the first fiber-reinforced structural component and/or the second fiber-reinforced structural component. A heating device may furthermore be provided within the tool, wherein the heat transfer from the tool to the fastening device is realized by means of thermal conduction. Such a heating device within the tool may consist, for example, of an electric heating element.

The fastening device, particularly its drilling component, may be heated before it penetrates or drills through the two fiber-reinforced structural components. However, the fastening device also may still be heated while the penetration is produced, for example by the tool. In addition to externally heating the region around the penetration, the frictional heat created due to the penetration process or drilling process can also contribute to heating this region. The structural components to be connected may furthermore be heated in the region of the penetration with laser beams of an external laser unit.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

When the same reference symbols are used in different figures in the following description of the figures, these reference symbols identify identical or similar elements. However, identical or similar elements may also be identified by different reference symbols.

Figure 1:
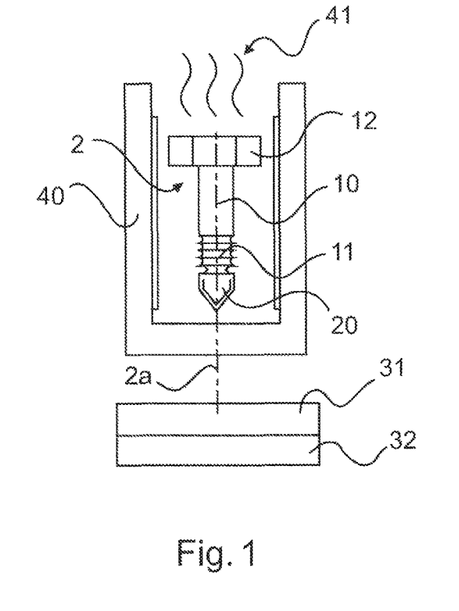
FIG. 1 shows a heating device for heating two fiber-reinforced structural components and a fastening device according to an exemplary embodiment.

FIG. 1 shows the heating of a fastening device 2 with a heating device 40, wherein the fastening device 2 is already heated before the penetration of a first fiber-reinforced structural component 31 and a second fiber-reinforced structural component 32. The heating device may for this purpose feature heating elements and emit thermal energy 41 to the fastening device 2 by means of thermal conduction and/or thermal radiation. The fastening device 2 features a connecting component 10 and a drilling component 20 that are arranged behind one another along a longitudinal axis 2a. The connecting component 10 and the drilling component 20 may be made of different materials. The drilling component 20 particularly may be separably fixed on the connecting component 10. The fastening device 2 furthermore features a head component 12 in the form of a screw head. The fastening component 2 also features an external thread 11 designed for producing a frictional connection between the two fiber-reinforced structural components 31, 32 in cooperation with a threaded nut that is not illustrated in FIG. 1 and screwed on the external thread after the penetration of the first fiber-reinforced structural component 31 and the second fiber-reinforced structural component 32. The first fiber-reinforced structural component 31 and/or the second fiber-reinforced structural component 32 may be made of a carbon fiber-reinforced plastic. The fibers of the fiber-reinforced structural components 31, 32 particularly are embedded in a thermoplastic matrix.

According to FIG. 1, the heating device 40 can heat the fastening device 2, as well as the first fiber-reinforced structural component 31 and the second fiber-reinforced structural component 32. In this case, the heating device 40 may only heat a section or region of the fiber-reinforced structural components 31, 32. In a top view of a surface of the first or second fiber-reinforced structural component 31, 32, for example, this region may be essentially circular. Only the part of the thermoplastic matrix, in which the penetration should ultimately be produced, is therefore softened in order to arrange the fastening device 2 therein. In this way, the fibers of the fiber-reinforced structural components 31, 32 can be respectively shifted and adapted to the shape of the penetration in the heated region.

Figure 2:
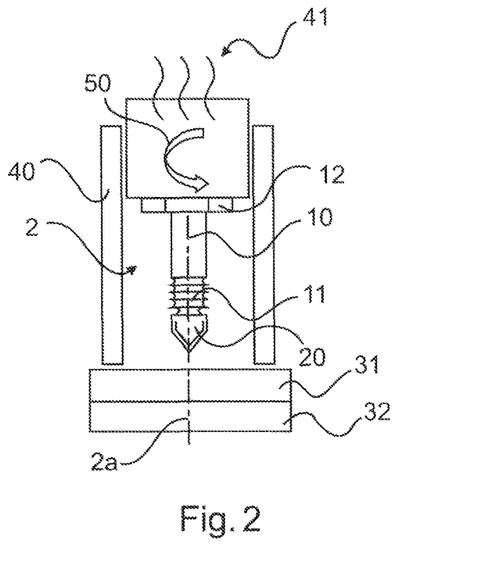
FIG. 2 shows a heating device for heating two fiber-reinforced structural components and a fastening device according to another exemplary embodiment.

FIG. 2 shows another example of a heating device 40 that is designed for heating the fastening device 2 before and/or while it penetrates the first fiber-reinforced structural component 31 and the second fiber-reinforced structural component 32. For example, the heating device 40 may be designed cylindrically or arranged around the fastening device 2. A tool carries out a rotatory motion 50 in order to rotationally drive the fastening device 2 into the two fiber-reinforced structural components 31, 32. For example, such a rotatory motion 50 may consist of a screw-type motion such that the drilling component 20 can be efficiently driven into the two fiber-reinforced structural components 31, 32. However, it would also be conceivable that the fastening device 2 is simply inserted or pushed into the two fiber-reinforced structural components 31, 32 due to a mere translatory motion along the longitudinal axis 2a of the fastening device 2. In this case, material is displaced from the region of the penetration to be produced. The fibers of the fiber-reinforced structural components 31, 32 are likewise pressed away from the longitudinal axis 2a in a direction extending perpendicular thereto. This can be achieved, in particular, by designing the drilling component 20 in a pointed fashion as shown in FIG. 2. The heating device 40 may be designed for also heating the tool during the respective rotatory motion 50 or translatory motion such that the fastening device 2 is heated by the tool due to thermal conduction. In this case, thermal energy 41 is transferred from the tool to the fastening device 2 by means of thermal conduction.

Figure 3:
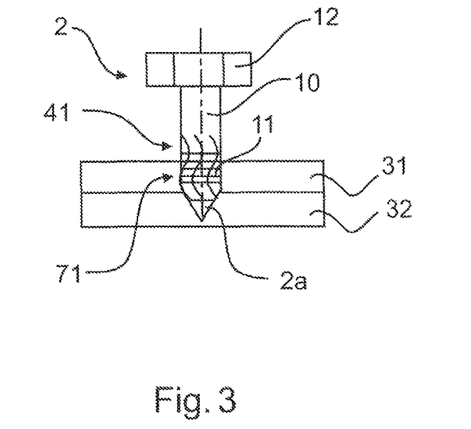
FIG. 3 shows the penetration of a fastening device through a first fiber-reinforced structural component and a second fiber-reinforced structural component according to an exemplary embodiment.

FIG. 3 shows the fastening device 2 while it penetrates or produces the penetration 71 through the first fiber-reinforced structural component 31 and the second fiber-reinforced structural component 32. The penetration 71 is particularly arranged in the heated region of the fiber-reinforced structural components 31, 32. The penetration of the fastening device 2 into the two fiber-reinforced structural components 31, 32 also releases frictional heat that contributes to heating the fastening device 2, as well as to heating the first fiber-reinforced structural component 31 and the second fiber-reinforced structural component 32, in addition to the thermal energy 41 supplied by the heating device 40. This heating process also allows the material of the fastening device 2 to fuse with the materials of the two fiber-reinforced structural components 31, 32, particularly with their thermoplastic matrix, such that an integral connection is ultimately produced between the fastening device and the two fiber-reinforced structural components 31, 32. In this way, the matrix of the first fiber-reinforced structural component 31 can likewise fuse with the matrix of the second fiber-reinforced structural component 32 in the region of the penetration 71 such that an integral connection is produced between both fiber-reinforced structural components 31, 32, as well as between the two fiber-reinforced structural components 31, 32 and the fastening device 2.

Figure 4:
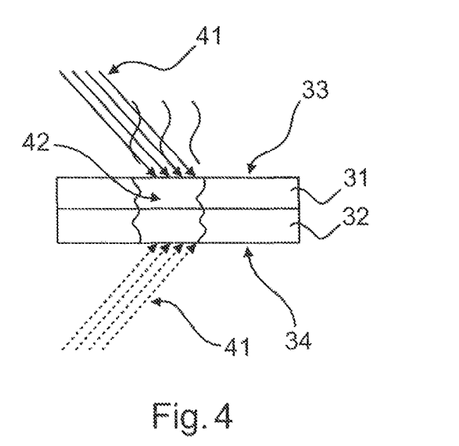
FIG. 4 shows the heating of a first fiber-reinforced structural component and a second fiber-reinforced structural component according to an exemplary embodiment.

FIG. 4 respectively shows the heating or the release of thermal energy 41 in the form of laser beams that are incident on a surface 33 of the first fiber-reinforced structural component 31, as well as on a surface 34 of the second fiber-reinforced structural component 32. A region 42, in which the penetration 71 that is not illustrated in FIG. 4 should be produced, is thereby heated. The laser beams are emitted by the heating device 40. In a top view of the surface 33 of the first fiber-reinforced structural component 31, the heated region is essentially circular. It is therefore possible to only heat the region, in which the penetration 71 should be produced.

Figure 5:
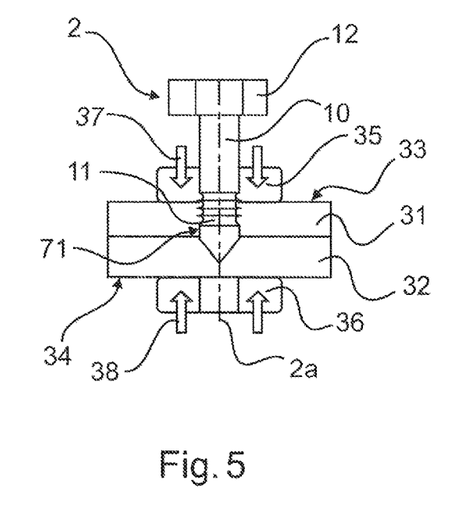
FIG. 5 shows an arrangement of two support disks for preventing geometric deformations on the surfaces of two fiber-reinforced structural components according to an exemplary embodiment.

FIG. 5 shows a first support disk 35 that is placed on the surface 33 of the first fiber-reinforced structural component 31 in a first predefined direction 37 in order to prevent a deformation of the first fiber-reinforced structural component 31, particularly on the surface 33. This figure furthermore shows a second support disk 36 that is positioned or placed on the surface 34 of the second fiber-reinforced structural component 32 in a second direction 38. Both support disks 35, 36 are designed for preventing a geometric deformation on the surfaces 33, 34 of the respective fiber-reinforced structural components 31, 32. Such a geometric deformation on the surfaces 33, 34 may be caused by the penetration 71 to be produced or being produced and the thusly displaced material in the region of the penetration 71. The fastening device 2 particularly is inserted or pressed into the two fiber-reinforced structural components 31, 32 such that the penetration 71 is produced. This process is promoted due to the previous or simultaneous heating of the region of the penetration 71 or of a region within the two fiber-reinforced structural components 31, 32 along the longitudinal axis 2a, respectively.

Figure 6:
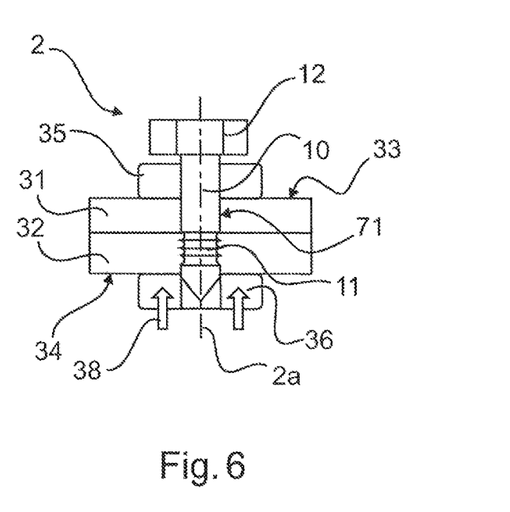
FIG. 6 shows an arrangement of two support disks for preventing geometric deformations on the surfaces of two fiber-reinforced structural components according to another exemplary embodiment.

FIG. 6 shows another example, in which the fastening device 2 penetrates the two fiber-reinforced structural components 31, 32 such that a penetration 71 is produced in the region heated by the heating device 40. The arrangement of the support disks 35, 36 prevents a deformation on the surface 33 of the first fiber-reinforced structural component 31 and on the surface 34 of the second fiber-reinforced structural component 32. In this case, the two fiber-reinforced structural components 31, 32 are penetrated by the fastening device, particularly by its cylindrical connecting component 10. The puncturing or the production of the penetration 71 is realized, for example, due to a translatory motion or a combined translatory and rotatory motion of the fastening device 2 in the direction of the longitudinal axis 2a. It would be conceivable that at least one of the support disks 35, 36 remains on the respective fiber-reinforced structural component 31, 32 after the penetration 71 has been produced.

It would furthermore be conceivable that the external thread 11 or the ribbed region 11 of the connecting element 10 does not remain in the through-bore and therefore also not within the first and/or the second fiber-reinforced structural component 31, 32. This region of the connecting element 10 particularly should protrude from the through-bore after the penetration of the fiber-reinforced structural components 31, 32. However, it would also be conceivable that this region remains in the through-bore after the penetration of the fiber-reinforced structural components 31, 32.

Figure 7:
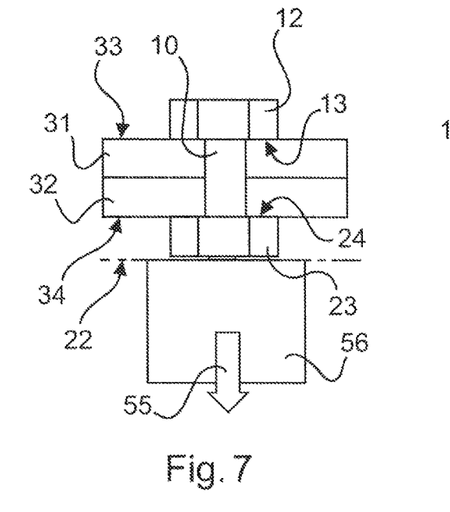
FIG. 7 shows the removal of the drilling component according to an exemplary embodiment.

FIG. 7 shows a tool 56 that serves for separating the drilling component 20 from the connecting component 10. In this case, the tool 40 is moved along the direction 55 indicated by an arrow and thereby separates the drilling component 20 from the connecting component 10. A parting plane is formed along the dividing line 22 after the separation or removal of the drilling component 20 from the connecting component 10. Furthermore, a threaded nut 23 can be screwed on the external thread 11 of the connecting component 10 in order to frictionally connect the two structural components 31, 32 to one another in cooperation with the head component 12 of the connecting component 10. For this purpose, the nut 23 features a supporting surface 24 that is in direct contact with the second structural component 32 in order to produce the frictional connection. The supporting surface 13 of the head component 12 is in direct contact with the first structural component 31 in order to frictionally connect the two structural components 31, 32. In this case, the supporting surface 13 of the head component 12 is in contact with the contact surface 33 of the first structural component 31 and the supporting surface 24 of the nut 23 is in contact with the contact surface 34 of the second structural component 32. However, it should be noted that FIG. 7 only shows the state that describes the frictional connection of the two structural components 31, 32.

Figure 8:
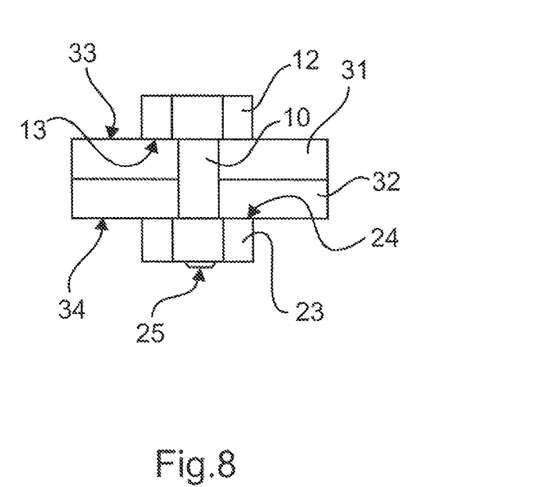
FIG. 8 shows the connection of two structural components by means of a fastening device according to an exemplary embodiment.

FIG. 8 shows the state of the frictional connection of the two structural components 31, 32, in which the drilling component 20 was already separated from the connecting component 10. The thusly formed parting plane 25 is also illustrated in FIG. 8. It should be noted that the illustration in FIG. 8 shows a connection between the two structural components 31, 32 by means of the connecting component 10, in which the frictional connection between the two structural components 31, 32 is produced by providing a screw-nut connection.

Figure 9:
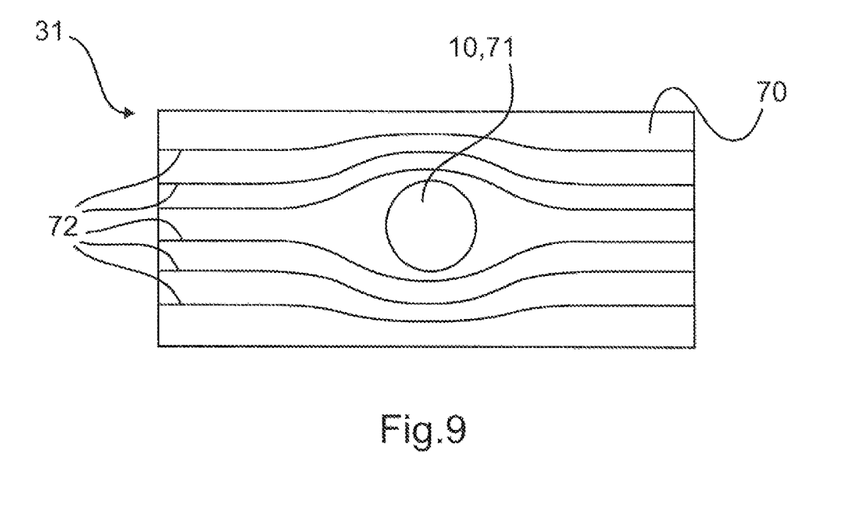
FIG. 9 shows a section through a fiber-reinforced structural component with a penetration according to an exemplary embodiment.

FIG. 9 shows a section through the first fiber-reinforced structural component 31, wherein the viewing direction extends along the longitudinal axis 2a of the penetration 71. The first fiber-reinforced structural component 31 and the second fiber-reinforced structural component 32, which is not illustrated in FIG. 9, respectively feature a matrix 70 and fibers 72. In this case, the matrix 70 features a thermoplastic material. The fibers 72 preferably consist of carbon fibers that essentially extend parallel to one another in layers within the matrix 70. The region of the penetration 71, into which the connecting component 10 of the fastening device 2 is inserted, is essentially circular. In the region of the penetration 71, the fibers 72 are adapted to the shape of the penetration 71. Such an adaptation of the fibers 72 can be achieved, in particular, by respectively heating the first fiber-reinforced structural component 31 and the second fiber-reinforced structural component 32 before or while the penetration 71 is produced. In this way, the thermoplastic matrix 70 softens such that the fibers 72 are pushed away from the longitudinal axis 2a. FIG. 9 particularly shows that the fibers 72 extend around the penetration 71. The inventive method therefore makes it possible to at least partially prevent the fibers from being damaged or separated while the penetration 71 is produced.

Figure 10:
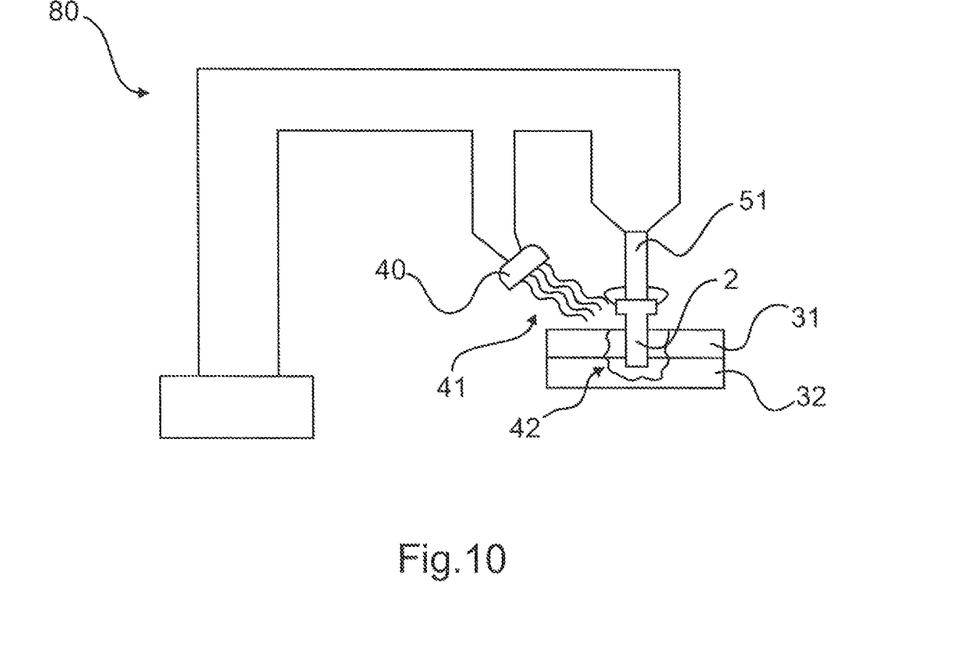
FIG. 10 shows a fastening system for connecting two fiber-reinforced structural components according to an exemplary embodiment.

FIG. 10 shows a fastening system 80 with a tool 51 that is designed for penetrating the first fiber-reinforced structural component 31 and the second fiber-reinforced structural component 32 with the fastening device 2 in order to thereby connect the first fiber-reinforced structural component 31 to the second fiber-reinforced structural component 32 by means of the fastening device 2. For example, the connection between the two fiber-reinforced structural components 31, 32 is respectively realized in the form of a positive or frictional connection or in the form of an integral connection. The fastening system 80 furthermore features a heating device 40 that is designed for heating the first fiber-reinforced structural component 31 and the second fiber-reinforced structural component 32 in the region of the penetration 71. In this case, the heated region 42 produced due to the heat emission of the heating device 40 is respectively limited to part of the first fiber-reinforced structural component 31 and the second fiber-reinforced structural component 32. The heating device 40 emits thermal energy 41 to the surface of the first fiber-reinforced structural component 31 or the second fiber-reinforced structural component 32, for example in the form of laser beams. The two fiber-reinforced structural components 31, 32 are heated, for example, before or while the penetration 71 is produced by means of the fastening device 2.

Figure 11:
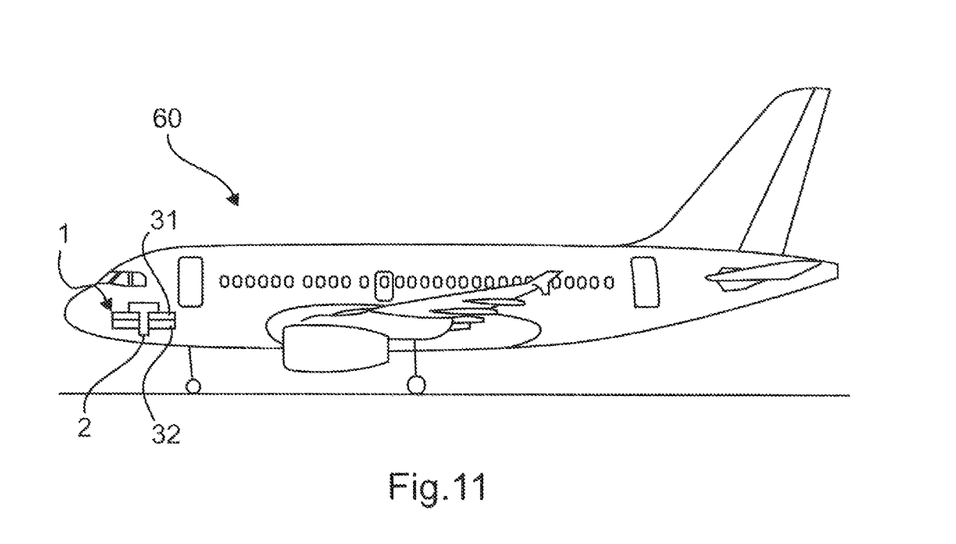
FIG. 11 shows an aircraft with a structural aircraft element according to an exemplary embodiment.

FIG. 11 shows an aircraft, particularly an airplane 60, with a structural aircraft element 1, wherein the structural aircraft element 1 is respectively arranged or installed in the airplane 60. The structural aircraft element 1 features a first fiber-reinforced structural component 31 and a second fiber-reinforced structural component 32. In this case, the two fiber-reinforced structural components 31, 32 are integrally or frictionally connected to one another by means of a fastening device 2. For example, the first fiber-reinforced structural component 31 or the second fiber-reinforced structural component 32 are primary structural components or second structural components of the airplane 60. For example, at least one of the two fiber-reinforced structural components 31, 32 is a frame, a stringer, a skin, a mount, a frame structure or a cabin trim part of the airplane 60.

Figure 12:
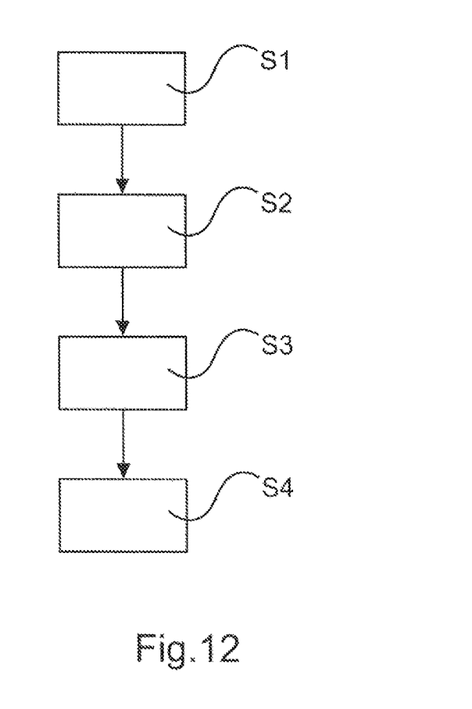
FIG. 12 shows a flowchart of a method for connecting fiber-reinforced structural components according to an exemplary embodiment.

FIG. 12 shows a flow chart of a method for connecting fiber-reinforced structural components. In a first step S1 of the method, a first fiber-reinforced structural component 31 and a second fiber-reinforced structural component 32 are supplied. In another step S2, the first fiber-reinforced structural component 31 and the second fiber-reinforced structural component 32 are heated by means of a heating device 40. Furthermore, a penetration 71 through the first fiber-reinforced structural component 31 and through the second fiber-reinforced structural component 32 is produced in another step S3 of the method by means of a fastening device 2. In another step S4, the first fiber-reinforced structural component 31 is connected to the second fiber-reinforced structural component 32 by means of the fastening device 2.

In this case, the heating of the first fiber-reinforced structural component 31 and the second fiber-reinforced structural component 32 by means of the heating device 40 may be carried out in combination with the production of the penetration 71 through the first fiber-reinforced structural component 31 and through the second fiber-reinforced structural component 32 by means of the fastening device 2. It should particularly be noted that the steps of the method can be carried out in any sequence, but also at least in part simultaneously.

As a supplement, it should be noted that "comprising" does not exclude any other elements or steps, and that "a" or "an" does not exclude a plurality. It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A method for connecting fiber-reinforced structural components, comprising the steps of:
   supplying a first fiber-reinforced structural component and a second fiber-reinforced structural component;
   heating the first fiber-reinforced structural component and the second fiber-reinforced structural component with a heating device;
   producing, with a fastening device, a penetration through the first fiber-reinforced structural component and the second fiber-reinforced structural component;
   heating the fastening device with the heating device before and/or while producing the penetration through the first fiber-reinforced structural component and the second fiber-reinforced structural component; and
   connecting the first fiber-reinforced structural component to the second fiber-reinforced structural component with the fastening device.

2. The method of claim 1, wherein the first fiber-reinforced structural component and the second fiber-reinforced structural component are heated with the heating device before and/or while producing the penetration through the first fiber-reinforced structural component and the second fiber-reinforced structural component.

3. The method of claim 1, wherein the fastening device is designed for additionally generating frictional heat for heating the first fiber-reinforced structural component and the second fiber-reinforced structural component while the penetration is produced.

4. The method of claim 1, wherein the first fiber-reinforced structural component and/or the second fiber-reinforced structural component are made of a carbon fiber-reinforced plastic.

5. The method of claim 1, wherein the fastening device is at least partially made of a carbon fiber-reinforced plastic.

6. The method of claim 1, wherein the penetration through the first fiber-reinforced structural component and the second fiber-reinforced structural component is produced in response to a mere translatory motion of the fastening device.

7. The method of claim 1, wherein the penetration through the first fiber-reinforced structural component and the second fiber-reinforced structural component is produced in response to a combination of a translatory motion and a rotatory motion of the fastening device.

8. A method for connecting fiber-reinforced structural components, comprising the steps of:
   supplying a first fiber-reinforced structural component and a second fiber-reinforced structural component;
   heating the first fiber-reinforced structural component and the second fiber-reinforced structural component with a heating device;

producing, with a fastening device, a penetration through the first fiber-reinforced structural component and the second fiber-reinforced structural component; and connecting the first fiber-reinforced structural component to the second fiber-reinforced structural component with the fastening device;

wherein the first fiber-reinforced structural component and the second fiber-reinforced structural component are heated by utilizing a laser beam.

9. A method for connecting fiber-reinforced structural components, comprising the steps of:

supplying a first fiber-reinforced structural component and a second fiber-reinforced structural component;

heating the first fiber-reinforced structural component and the second fiber-reinforced structural component with a heating device;

producing, with a fastening device, a penetration through the first fiber-reinforced structural component and the second fiber-reinforced structural component; and connecting the first fiber-reinforced structural component to the second fiber-reinforced structural component with the fastening device;

wherein the fastening device comprises a connecting component and a drilling component that can be separated from the connecting component, and wherein the connecting component and the drilling component are arranged behind one another along a longitudinal axis of the fastening device.

10. The method of claim 9, wherein the connecting component and the drilling component are made of different materials.

11. The method of claim 9, further comprising:

providing the connecting component with an external thread that is designed for frictionally connecting the first fiber-reinforced structural component to the second fiber-reinforced structural component.

12. A method for connecting fiber-reinforced structural components, comprising the steps of:

supplying a first fiber-reinforced structural component and a second fiber-reinforced structural component;

arranging a first support disk on a surface of the first fiber-reinforced structural component in a region of penetration;

heating the first fiber-reinforced structural component and the second fiber-reinforced structural component with a heating device;

producing, with a fastening device, a penetration through the first fiber-reinforced structural component and the second fiber-reinforced structural component; and connecting the first fiber-reinforced structural component to the second fiber-reinforced structural component with the fastening device;

wherein the first support disk is designed for preventing a geometric deformation on the surface of the first fiber-reinforced structural component while the penetration through the first fiber-reinforced structural component is produced.

13. The method of claim 12, further comprising:

arranging a second support disk on a surface of the second fiber-reinforced structural component in the region of penetration;

wherein the second support disk is designed for preventing a geometric deformation on the surface of the second fiber-reinforced structural component while the penetration through the second fiber-reinforced structural component is produced.

14. A method for connecting fiber-reinforced structural components, comprising:

supplying a first fiber-reinforced structural component and a second fiber-reinforced structural component;

heating the first fiber-reinforced structural component and the second fiber-reinforced structural component with a heating device;

producing, with a fastening device, a penetration through the first fiber-reinforced structural component and the second fiber-reinforced structural component;

connecting the first fiber-reinforced structural component to the second fiber-reinforced structural component with the fastening device, wherein the first fiber-reinforced structural component and the second fiber-reinforced structural component are heated with the heating device before and/or while producing the penetration through the first fiber-reinforced structural component and the second fiber-reinforced structural component; and heating the fastening device with the heating device before and/or while producing the penetration through the first fiber-reinforced structural component and the second fiber-reinforced structural component.

15. The method of claim 14, wherein the first fiber-reinforced structural component and the second fiber-reinforced structural component are heated by utilizing a laser beam, and wherein the fastening device is designed for additionally generating frictional heat for heating the first fiber-reinforced structural component and the second fiber-reinforced structural component while the penetration is produced.

16. The method of claim 15, wherein the fastening device comprises a connecting component and a drilling component that can be separated from the connecting component, and wherein the connecting component and the drilling component are arranged behind one another along a longitudinal axis of the fastening device, and wherein the connecting component and the drilling component are made of different materials.

17. The method of claim 16, further comprising the step of:

providing the connecting component with an external thread that is designed for frictionally connecting the first fiber-reinforced structural component to the second fiber-reinforced structural component, wherein the first fiber-reinforced structural component and/or the second fiber-reinforced structural component are made of a carbon fiber-reinforced plastic, and wherein the fastening device is at least partially made of a carbon fiber-reinforced plastic.

18. The method of claim 17, further comprising the steps of:

arranging a first support disk on a surface of the first fiber-reinforced structural component in the region of the penetration, wherein the first support disk is designed for preventing a geometric deformation on the surface of the first fiber-reinforced structural component while the penetration through the first fiber-reinforced structural component is produced; and arranging a second support disk on a surface of the second fiber-reinforced structural component in the region of the penetration;

wherein the second support disk is designed for preventing a geometric deformation on the surface of the second fiber-reinforced structural component while the penetration through the second fiber-reinforced structural component is produced; and
wherein the penetration through the first fiber-reinforced structural component and the second fiber-reinforced structural component is produced in response to a mere translatory motion of the fastening device or in response to a combination of a translatory motion and a rotatory motion of the fastening device.

* * * * *